(12) United States Patent
Burgbacher et al.

(10) Patent No.: US 6,382,041 B1
(45) Date of Patent: May 7, 2002

(54) GEARSHIFT DEVICE

(75) Inventors: Martin Burgbacher, Esslingen; Martin Grieb, Goeppingen-Faurndau; Torsten Kroeger, Stuttgart; Bernd-Heinrich Schmitfranz, Esslingen, all of (DE)

(73) Assignee: DiamlerChrysler AG, Stuttgart (DE)

( * ) Notice: Subject to any disclaimer, the term of this patent is extended or adjusted under 35 U.S.C. 154(b) by 0 days.

(21) Appl. No.: 09/721,747

(22) Filed: Nov. 27, 2000

(30) Foreign Application Priority Data

Nov. 27, 1999 (DE) .......................................... 199 57 151

(51) Int. Cl.⁷ .............................................. F16H 61/12
(52) U.S. Cl. ....................................................... 74/335
(58) Field of Search ........................... 74/335; 477/907; 701/62

(56) References Cited

U.S. PATENT DOCUMENTS 4,790,204 A   12/1988   Tury et al. ............... 74/483 PB
5,696,679 A * 12/1997   Marshall et al. ......... 364/424.1

FOREIGN PATENT DOCUMENTS

WO    WO 96/25612    8/1996

* cited by examiner

*Primary Examiner*—Dirk Wright
(74) *Attorney, Agent, or Firm*—Crowell & Moring LLP

(57) ABSTRACT

A gearshift device comprises an input unit for receiving input data which is connected via at least one data line to a first controller via which an actuator unit can be controlled for setting a gearbox, especially an automatic gearbox of a motor vehicle, and comprising at least one second controller which is independent of the first controller. The second controller is separate from the first controller and is connected to the input unit via at least one data line. In the case of a fault in the first controller, the actuator unit can be controlled by the second controller at least partially correspondingly to the first controller.

30 Claims, 7 Drawing Sheets

GEARSHIFT DEVICE

BACKGROUND AND SUMMARY OF THE INVENTION

This application claims the priority of German patent document 199 57 151.1, filed Nov. 27 1999, the disclosure of which is expressly incorporated by reference herein.

The invention relates to a gearshift device for a motor vehicle.

In modern motor vehicles, the demands on gearshift devices are steadily increasing with respect not only to comfort, but also reliability, constructional space and weight, and with regard to supporting a driver of a motor vehicle. An advantageous effect can frequently be achieved by replacing mechanical components or assemblies by electronic components and assemblies.

As a rule, a gearshift device has an input unit for receiving input data or, a driver's request. In most cases, the input unit is constructed as a gearshift lever which is connected to a gearbox via a rod linkage.

U.S. Pat. No. 4,790,204, discloses a generic gearshift in which a mechanical connection between an input unit and an automatic gearbox is replaced by an electronic assembly, making it possible to reduce components, weight, constructional space and assembly effort. The input unit has an input device with pushbuttons for selecting from amongst various gearshift positions, such as, for example, a park position P, a neutral position N, a drive position D, etc. The input device is electrically connected via a controller to an actuating unit which is mounted on an outer side of a gearbox housing and acts on an actuating lever. When an accelerator pedal is completely pushed down, a second controller receives a signal and drives a kick-down lever on the gearbox by means of the actuating unit.

One object of the present invention is to provide a gearshift device of the generic type which achieves enhanced reliability and comfort.

This and other objects and advantages are achieved by the gearshift device according to the invention, in which an input unit for receiving input data is connected via at least one data line to a first controller for controlling an actuator unit for adjusting a gearbox (such as an automatic gearbox of a motor vehicle). At least one second controller is also provided, which is independent of the first controller, and is also connected to the input unit via at least one data line. In the case of a fault in the first controller, the actuator unit can be controlled by the second controller at least partially correspondingly to the first controller. Due to the second controller, a high reliability can be achieved without any additional mechanical assembly. Advantageously, the second controller is also used for monitoring the first controller; it receives at least in part (and preferably completely) the same input data as the first controller and performs at least partly (and preferably entirely) the same evaluation and comparing the output variables for the purpose of monitoring. This saves an additional monitoring unit.

In the case of a fault, and an unacceptable deviation of the output variables, the second controller deactivates the first controller and at least partially takes over the operation of the first controller, making it possible to avoid having an additional unit for disconnecting the first controller. In this arrangement, the controllers are advantageously connected to the actuator unit via tristate lines, which supply information and electrical power for the actuator unit. Having a direct data line between the controllers can be avoided.

Furthermore, the tristate lines can be advantageously used for deactivating the first controller by means of the second controller, in that the tristate lines of the controllers are connected to one another; in the case of a fault, the second controller short-circuits at least one tristate line, thereby deactivating the first controller via a current limiter. A current limiter which, as a rule, already exists, can be additionally used for disconnecting the first controller, wherein the current limiter can be integrated in the controller or also constructed as a separate unit.

If a fault occurs while the controller (or the first controller) is in a deactivated state, the activator unit assumes or maintains a position in which a flow of force between the gearbox and an internal combustion engine is interrupted. Accordingly, it is always possible to achieve a safe state for the gearbox and, especially, for the motor vehicle and its passengers. This can be achieved by means of various known actuators; for example by means of a hydraulic actuator which, in the deactivated state, moves into an initial position by means of a spring force or, advantageously, by means of an electromagnetic actuator comprising a spring mechanism which, in the deactivated state, holds an armature in a neutral position between two pole faces of electromagnets. Starting with a safe state, the second controller can subsequently take over the control of the actuator unit.

The controllers are advantageously connected to a data network of the motor vehicle, as a result of which vehicle data such as speed, speed sense, temperature, etc. can be taken into consideration in controlling the actuator unit. It is possible to use existing sensors and avoid using additional sensors at least to a large extent. It is also possible to transmit information from the controllers to other controllers via the data network, for example the power of the internal combustion engine can be advantageously reduced in a deactivated state of the actuator unit in order to avoid unwanted high idling revolutions.

Apart from the control functions of the gearbox, one or both controllers can be used for other operations, for example for an engine control, etc., as a result of which additional components and constructional space can be saved.

In one embodiment of the invention, the actuator unit has at least one first actuator and one second actuator, which is independent of the first actuator. The first actuator is used, in normal operation, for setting a drive position and a neutral position at the gearbox, and the second actuator is used for operating a parking lock in a park position of the gearbox. In an automatic gearbox, a selector slide can be advantageously constructed with only three positions instead of four positions, which makes it possible to save costs and constructional space. Furthermore, additional degrees of freedom are obtained in the driving and in the arrangement of the actuators. The actuators can be advantageously driven independently of one another in various situations; for example a drive position D or R can be set at the gearbox by means of the first actuator when starting on an incline and the parking lock can only be released via the second actuator from a certain engine power on. This makes it possible to prevent a rolling movement of the motor vehicle in an unwanted direction and to save energy and reduce wear.

The second actuator can be constructed, for example, as an electric motor or electro-hydraulically.

If the second actuator is arranged in a housing of the gearbox, a compact assembly can be achieved which can be separately manufactured and checked for its operations.

However, the second actuator and, in particular, the parking lock can also be arranged advantageously outside the gearbox housing, as a result of which the gearbox can be constructed in an especially space-saving manner. The second actuator can be integrated in a wheel hub of the motor vehicle or advantageously mounted on a chassis part. As a rule, a motor vehicle chassis is connected to wheels of the motor vehicle via a spring system, as a result of which the mass of the second actuator mounted on the chassis part advantageously belongs to the spring-mounted mass.

Furthermore, a parking brake can be preferably operated by means of a second actuator which is arranged outside the gearbox housing. It is possible to use one actuator for operating the parking brake and the parking lock and, as a result, to save one actuator. In an embodiment according to the invention, it is also proposed that the parking lock and the parking brake be constructed of one piece; as a result, it is possible to save components, constructional space, installation effort and costs.

To hold the parked motor vehicle reliably without energy expenditure in the parked state, according to another embodiment of the invention, the parking lock is self-locking, such as by means of a shoe brake. So that the parking lock can also be used as a braking unit when the motor vehicle is moving at relatively large traveling speeds, however, it is advantageously self-locking only below a certain traveling speed, for example below 3 km/h.

The parking lock can also be constructed as parking lock catch.

In a further embodiment, it is proposed that, in the case of a fault in the first actuator, the gearbox can be adjusted via the second actuator at least to a limited extent; as a result, the reliability can be increased without an additional actuator.

The first actuator is advantageously arranged in a housing of the gearbox, so that it is protected against external influences such as, for example, splashed water, heat radiation from an exhaust gas system, large temperature fluctuations, etc. Furthermore, it is possible to utilize any constructional space which may still exist in the gearbox housing and to avoid additional constructional space.

As a rule, the various gearshift positions of an automatic gearbox are set via a hydraulic slide valve, by which volume flows can be appropriately controlled. The first actuator can be connected to the hydraulic slide valve via a linkage or can advantageously act directly on the hydraulic slide valve, as a result of which a rod linkage can be avoided and constructional space saved. To be able to use as many standard components as possible, the first actuator is adapted to existing gearboxes or, respectively, gearbox housings and hydraulic units.

It is also proposed that the input unit have at least one first input device, and a second input device which is independent of the first input device. In the case of a fault in the first input device, input data intended at least partially for the first input device can be input via the second input device which makes it possible to further increase the reliability.

The second input device can be formed by various devices which are known to the expert. However, an input device which, in normal operation, has a function different from that of the first input device is advantageously used, so that an additional input device can be saved. Particularly advantageously, input devices are used which, in normal operation, have no significance for the driving characteristics and can be easily omitted in emergency driving operation, such as, for example, an input device for controlling an air-conditioning system, a GPS (global positioning system), a radio cassette system, etc. When the second input device is used, the driver will be advantageously guided via a menu, for example visually via a display or aurally via loudspeakers.

The second input device can be arranged at various positions in a passenger space, preferably in the area of a steering wheel of the motor vehicle. Advantageously it can also be integrated in the steering wheel. During the input process, a driver of the motor vehicle can hold the steering wheel with both hands, so that high driving safety and high comfort can be achieved.

In a further embodiment according to the invention, input data can be entered orally into the input unit. For this purpose, existing microphones and/or existing voice recognition modules in hardware and software can be advantageously used, for example a hands-free system of a telephone, of a GPS, etc. Additional constructional space can be saved and comfort can be further enhanced.

The state of readiness to receive can be activated by means of a key and/or by means of an oral codeword; for example by activating a state of readiness to receive by means of the term "gearshift" and then controlling the gearbox by means of certain terms such as, for example, "forward", "reverse", "neutral", "park", etc.

Information relating to the gearbox (for example which gear is selected, etc.) is frequently output via a display. However, it may be appropriate in various situations to output certain information audially, especially information which notifies the driver of a hazard or which was overlooked on the display over a certain period, (for example, missing park position after parking the vehicle, high revolutions of the internal combustion engine, etc.) To avoid additional loudspeakers, those which already exist are preferably used, for example of a radio cassette system, of a GPS, etc.

Comfort can be further enhanced by at least one of the controllers being connected directly and/or via a data network of the motor vehicle to a driver assistance system. It is also possible to integrate a driver assistance system in one of the two controllers.

The driver of the motor vehicle can be supported in various tasks which would be known to the expert. For this purpose, it is necessary in most cases to recognize what the driver wants.

This can be frequently achieved by detecting a number of parameters and evaluating them in association, such as, for example, traveling speed, inclination of a roadway, accelerator pedal position, position of the gearbox, rotational speed of the internal combustion engine, etc.

It is proposed that, when the motor vehicle is being parked, the actuator unit automatically closes a parking lock, and/or automatically opens the parking lock when a desire to drive off has been detected. If it is detected that the driver wishes the motor vehicle to stay at a standstill, for example by the accelerator pedal not being operated over a certain period when the motor vehicle is at a standstill, the actuator unit can advantageously automatically interrupt a flow of force between the gearbox and the internal combustion engine and, as a result, reduce the energy consumption and the wear.

Furthermore, it is proposed in an embodiment of the invention that, in the case of an impending impact of the motor vehicle against an object, the controller and/or the driver assistance system intervene(s) in the vehicle control and counteract(s) the impact, especially when the motor vehicle is being parked. It is possible to intervene in the control of the vehicle direction and especially in the control of the vehicle speed by means of the controller and/or the driver assistance system; for example, using the controller, it is possible to interrupt the flow of force between the gearbox and the internal combustion engine by means of the first actuator and to decelerate and stop the motor vehicle in front of the object by means of the second actuator via a braking unit or, respectively, by means of the parking lock. The impending impact can be advantageously detected by means of ultrasonic sensors which already exist in many motor vehicles as parking aids.

Furthermore, a movement of the motor vehicle in an unwanted direction, for example when starting on an incline, can be automatically prevented by means of the second actuator.

Other objects, advantages and novel features of the present invention will become apparent from the following detailed description of the invention when considered in conjunction with the accompanying drawings.

DETAILED DESCRIPTION OF THE DRAWINGS

Figure 1:
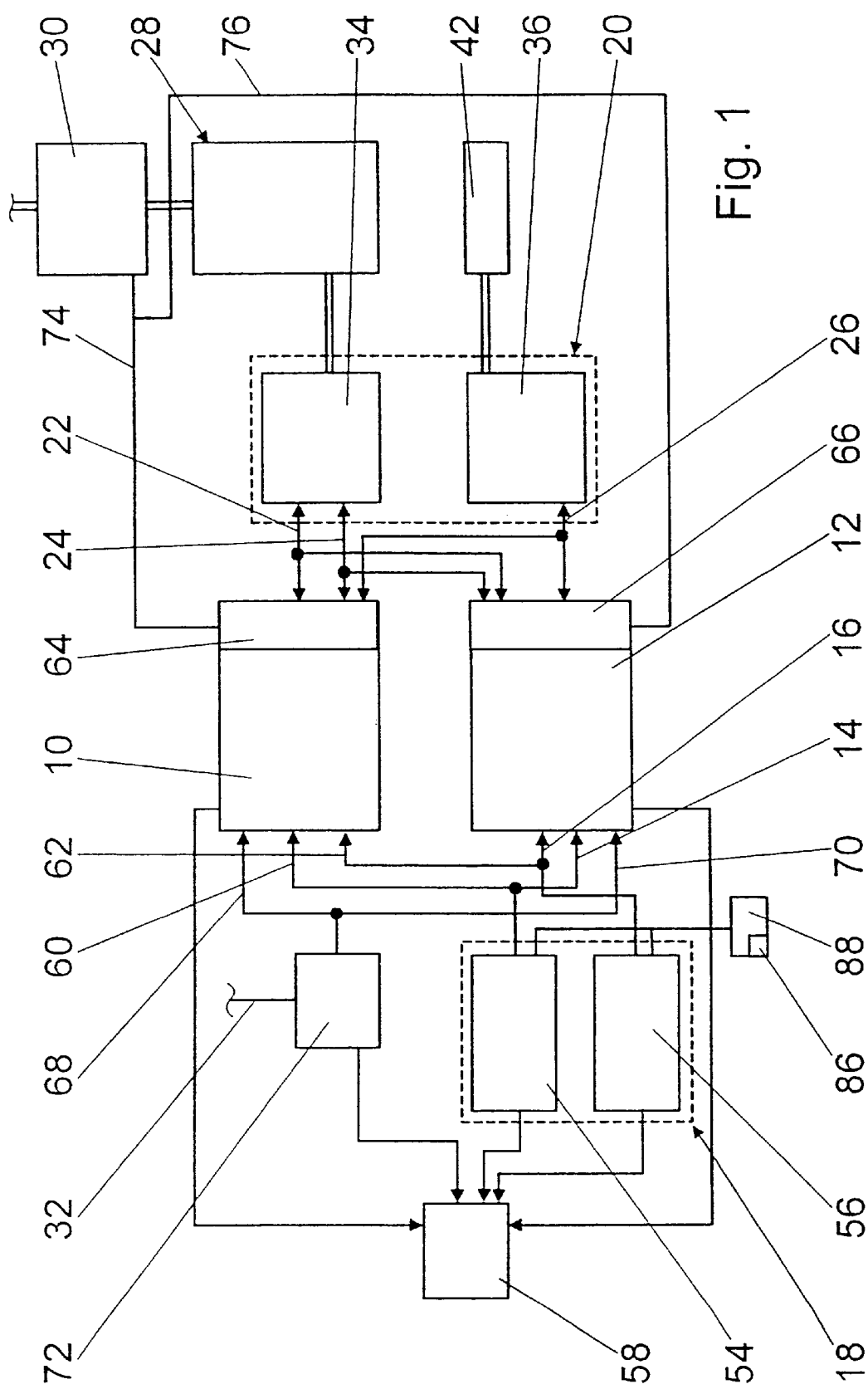
FIG. 1 is a diagrammatic representation of a device according to the invention.

FIG. 1 is a diagrammatic representation of a gearshift device, according to the invention, of a motor vehicle comprising an input unit 18 for receiving input data R, N, D, P, with R standing for a reversing position, N standing for a neutral position, D standing for a forward driving position and P standing for a park position). The input unit 18 is connected via data lines 60, 62 to a first controller 10 via which an actuator unit 20 can be controlled for setting an automatic gearbox 28.

According to the invention, the gearshift device has a second controller 12, which is independent of the first controller 10 and which is connected to the input unit 18 via data lines 14, 16. In the case of a fault in the first controller 10, the actuator unit 20 can be controlled by means of the second controller 12 correspondingly to the first controller 10 and, as a result, a high level of reliability can be achieved.

The first and second controllers 10, 12 are connected to a data network 32 via data lines 68, 70 and a further controller 72. The vehicle data FD acquired from the data network 32 are, in particular, traveling speed and direction of travel. The second controller 12 receives the input data R, N, D, P from the input unit 18 and the vehicle data FD from the data network 32 of the motor vehicle or, respectively, from the controller 72 at the same time as the first controller 10. The second controller 12 performs the same evaluations as the first controller 10 and compares the evaluated output variables for monitoring the first controller 10. If the second controller 12 detects a fault in the first controller 10 due to an unacceptable deviation of the evaluated output variables, the second controller 12 deactivates the first controller 10 and takes over its operation.

The controllers 10, 12 are in each case connected to the actuator unit 20 via tristate lines 22, 24, 26 via which control signals and electrical power can be conducted for operating the actuator unit 20. The tristate lines 22, 24, 26 are driven via driver stages 64, 66 in the controllers 10, 12 and are connected to one another. If a fault occurs in the first controller 10, the tristate line 22, 24, 26 which would forward the wrong signal to the actuator unit 20 is short-circuited by the second controller 12. As a result, the first controller 10 is deactivated via a current limiter, not shown in greater detail.

Apart from the gearbox control function, the first controller 10 has a function for controlling an internal combustion engine 30. In this function, the first controller 10 is monitored by the second controller 12 in accordance with the gearbox control function and can be replaced by the second controller 12 in the case of a fault. For this purpose, both controllers 10, 12 are connected to the internal combustion engine 30 by means of interconnected tristate lines 74, 76.

The actuator unit 20 has a first electromagnetic actuator 34 and a second actuator 36 which is independent of the first actuator 34, the first actuator 34 being used for setting a driving position R, D and a neutral position N at the automatic gearbox 28 in normal operation and the second actuator 36 being used for operating a parking lock 42 in a park position P of the automatic gearbox 28. In a deactivated state, the first actuator 34 assumes the neutral position N in which a flow of force between the automatic gearbox 28 and the internal combustion engine 30 is interrupted. The first actuator 34 is in each case connected to the controllers 10, 12 via two tristate lines 22, 24, in which arrangement the reversing position R can be set by means of a tristate line 22 and the forward driving position D can be set by means of a tristate line 24 at the automatic gearbox 28.

Each tristate line 22, 24, 26, 74, 76 can be driven in three ways, in that a voltage is present at the output of the controller 10, 12, the so-called active state 1, in that no voltage is present at the output and the controller 10, 12 is connected to earth via the actuator unit 20, the so-called inactive state i, and in that the tristate line 22, 24, 26, 74, 76 is short-circuited to earth, the so-called blocked state 0.

Figure 2:
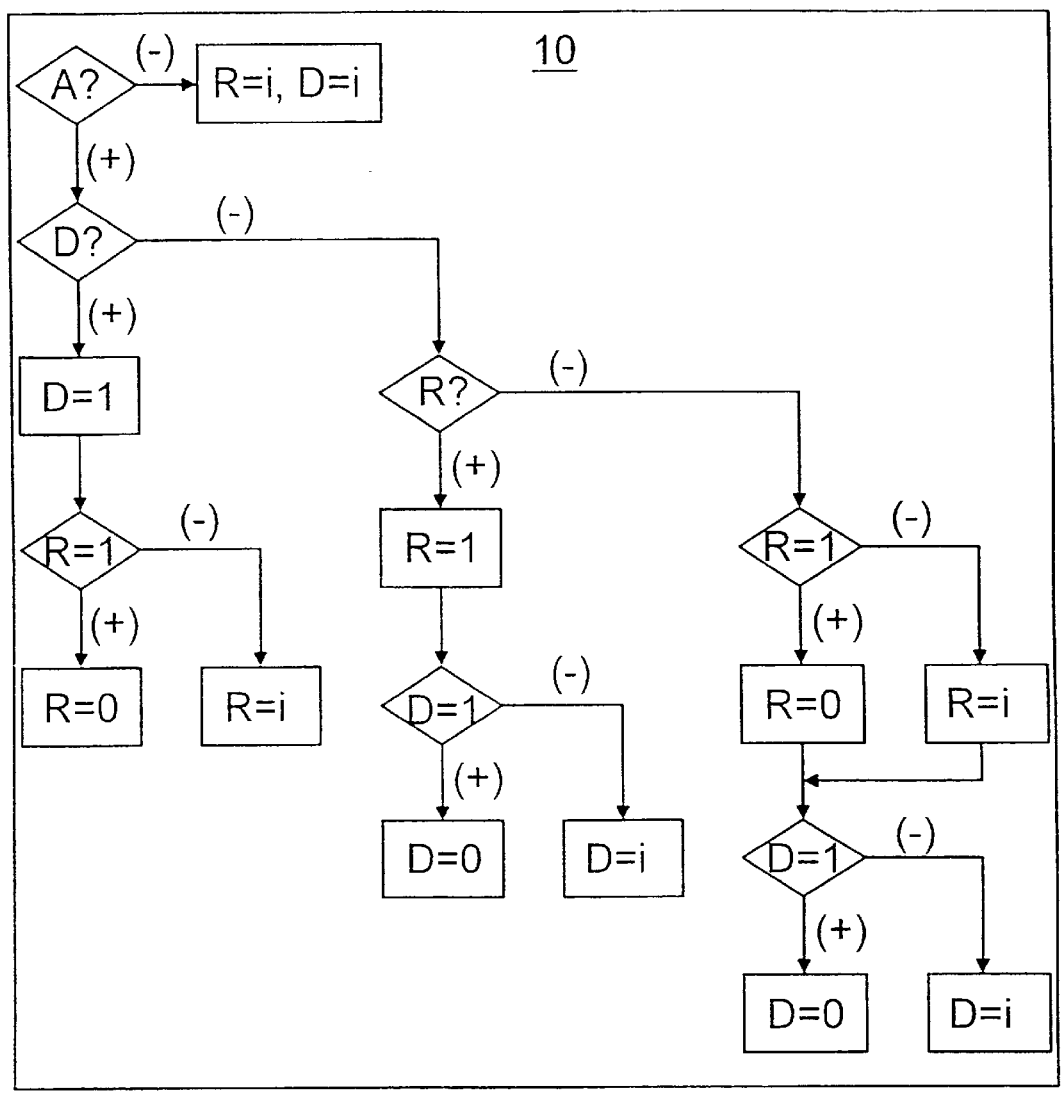
FIG. 2 is a block diagram of a first controller according to the invention.

FIG. 2 shows a block diagram of the first controller 10 for driving the first actuator 34. In a first interrogation, a check is made as to whether the first controller 10 is in an activated state A. If this is answered in the negative, the two tristate lines 22, 24, i.e. driving positions R and D, are in an inactive state i originating from the first controller 10. If the interrogation is answered in the affirmative, a check is made in a second interrogation as to whether the driver of the motor vehicle has selected driving position D. If it is found to be so, the tristate line 24 for the driving position D is moved into an active state 1 by the first controller 10. Subsequently, a check is made as to whether the tristate line 22 for driving position R is activated. If this is activated by the second controller 12, the tristate line 22 for the driving position R is blocked by the first controller 10. If the tristate line 22 is not activated, the tristate line 22 can be set to the inactive state i by the first controller 10.

If the driver has not selected driving position D, a check is made as to whether driving position R has been selected. If it is found to be so, the tristate line 22 is moved into the active state 1 by the first controller 10. Subsequently, a check is made as to whether the tristate line 24 for driving position D is activated by the second controller 12. If this is so, the tristate line 24 is blocked by the first controller 10, and, if the tristate line 24 is not activated, the tristate line 24 is placed into the inactive state i by the first controller 10.

If the driver has not selected either driving position R or D, a check is made in a further interrogation as to whether the tristate line 22 for driving position R is activated by the second controller 12. If the tristate line 22 is activated, it is blocked by the first controller 10; if the tristate line 22 is not activated, the tristate line 22 is placed into the inactive state i by the first controller 10. Subsequently, a check is made as to whether the tristate line 24 for driving position D is activated by the second controller 12. If the tristate line 24 is activated, it will be blocked by the first controller 10; if the tristate line 24 is not activated, the tristate line 24 will be placed into the inactive state i by the first controller 10.

Figure 3:
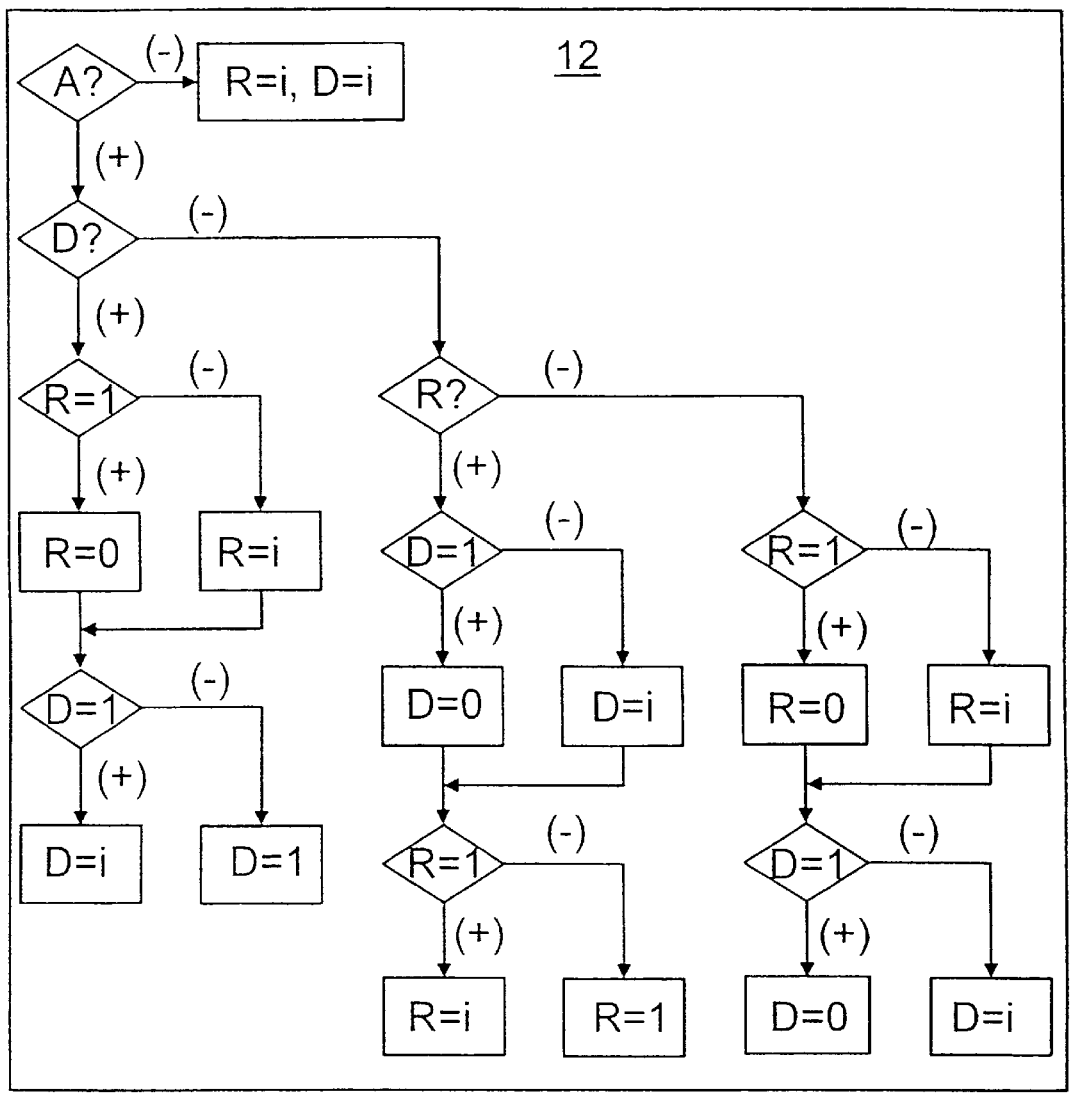
FIG. 3 is a block diagram of a second controller according to the invention.

FIG. 3 shows a block diagram of the second controller 12 for monitoring the first controller 10 and for driving the first actuator 34 in the case of a fault. In a first interrogation, a check is made as to whether the second controller 12 is in an activated state A. If this is answered in the negative, the two tristate lines 22, 24, i.e. driving positions R and D, are in an inactive state i originating from the second controller 12. If the interrogation is answered in the affirmative, a check is made in a second interrogation as to whether the driver of the motor vehicle has selected driving position D. If it is found to be so, a check is made in a further interrogation as to whether the tristate line 22 of driving position R is activated by the first controller 10. If an activated tristate line 22 is found, it will be blocked by the second controller 12 and, at the same time, the first controller 10 will be deactivated by a current limiter. If no activated tristate line 22 is found, the tristate line 22 will be placed into an inactive state i originating from the second controller 12.

Subsequently, a check is made as to whether the tristate line 24 for driving position D is activated by the first controller 10. If an activated tristate line 24 is present, the tristate line 24 can be placed into an inactive state i by the second controller 12 since a voltage is already present. If the tristate line 24 for driving position D is not activated, it will be placed into an active state 1 by the second controller 12.

If the driver has not selected driving position D, a check is made as to whether driving position R has been selected. If it is found to be so, a check is made in a further interrogation as to whether the tristate line 24 of driving position D is activated by the first controller 10. If an activated tristate line 24 is found, it will be blocked by the second controller 12; and, at the same time, the first controller 10 will be deactivated by a current limiter. If no activated tristate line 24 is found, the tristate line 24 will be placed into an inactive state i originating from the second controller 12.

Subsequently, a check is made as to whether the tristate line 22 for driving position R is activated. If an activated tristate line 22 is present, the tristate line 22 can be placed into an inactive state i by the second controller 12 since a voltage is already present. If the tristate line 22 for driving position R is not activated, it will be placed into an active state 1 by the second controller 12.

If the driver has not selected either driving position R or D, a check is made in a first interrogation as to whether the tristate line 22 for driving position R has been activated by the first controller 10. If the tristate line 22 is activated, it will be blocked by the second controller 12; if tristate line 22 is not activated, the tristate line 22 will be placed into the inactive state i by the second controller 12. Subsequently, a check is made as to whether the tristate line 24 for driving position D is activated by the first controller 10. If the tristate line 24 is activated, it will be blocked by the second controller 12; if the tristate line 24 is not activated, the tristate line 24 will be placed into the inactive state i by the second controller 12.

Figure 8:
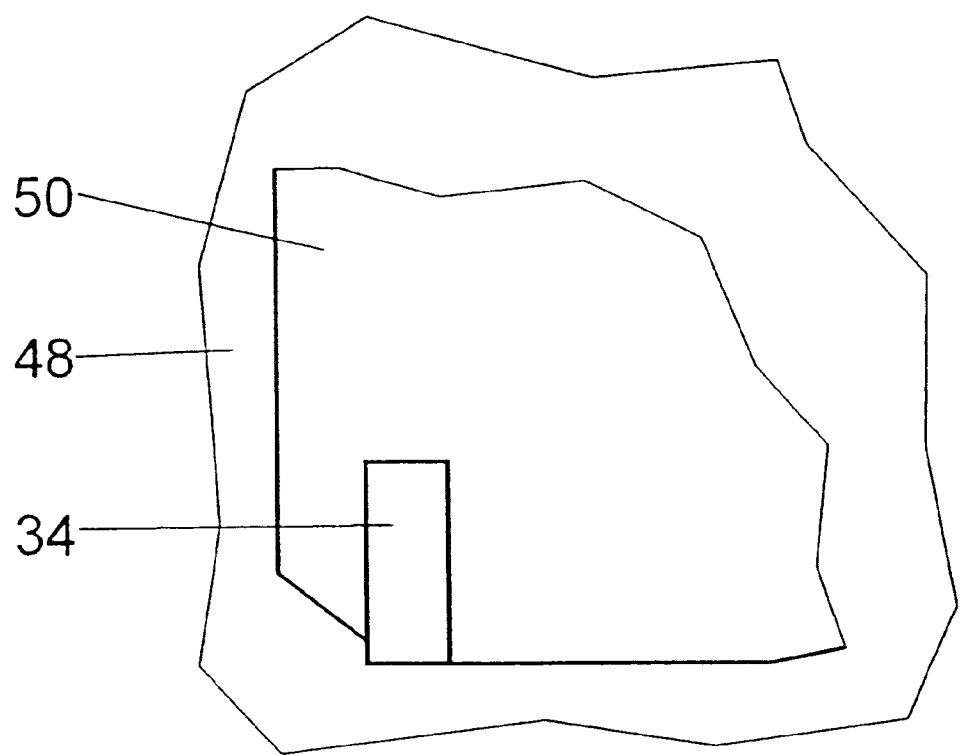
FIG. 8 shows a diagrammatic section of an hydraulic plate of an automatic gearbox comprising an actuator for setting the gearbox.
Figure 9:
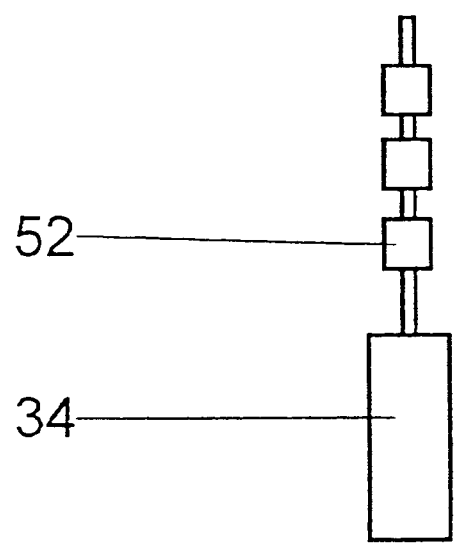
FIG. 9 shows the actuator of FIG. 8 in a removed state.

The first actuator 34 is arranged in a gearbox housing 48 of the automatic gearbox 28 (FIGS. 8 and 9). The actuator is mounted on an hydraulic plate 50 and acts directly on an hydraulic slide valve 52 via which a volume flow in the automatic gearbox 28 can be controlled in accordance with the three positions R, N and D. If the first actuator 34 is set to driving position D, no volume flow can be conducted via separately driven valves in such a manner that the automatic gearbox 28 changes to driving position R and conversely.

Figure 4:
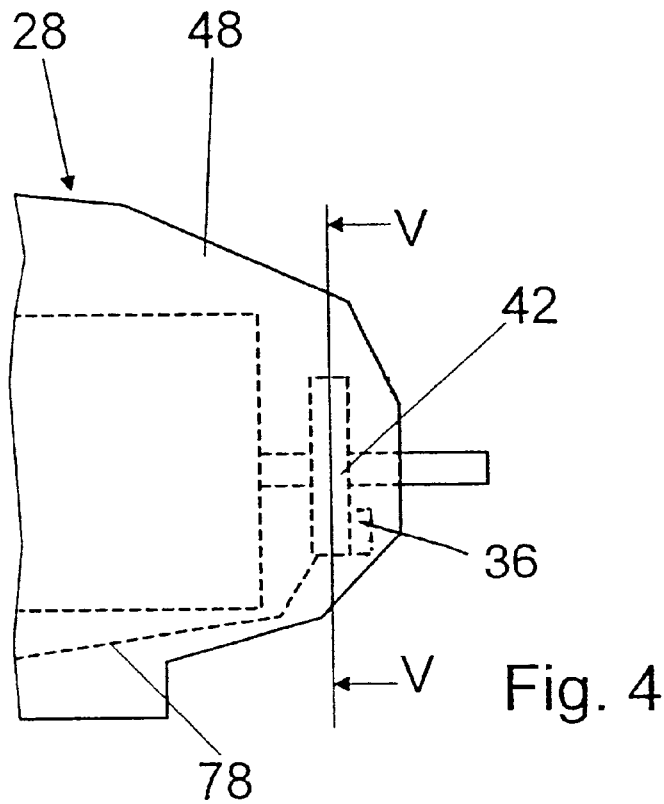
FIG. 4 is an actuator for operating a parking lock in a gearbox housing.
Figure 5:
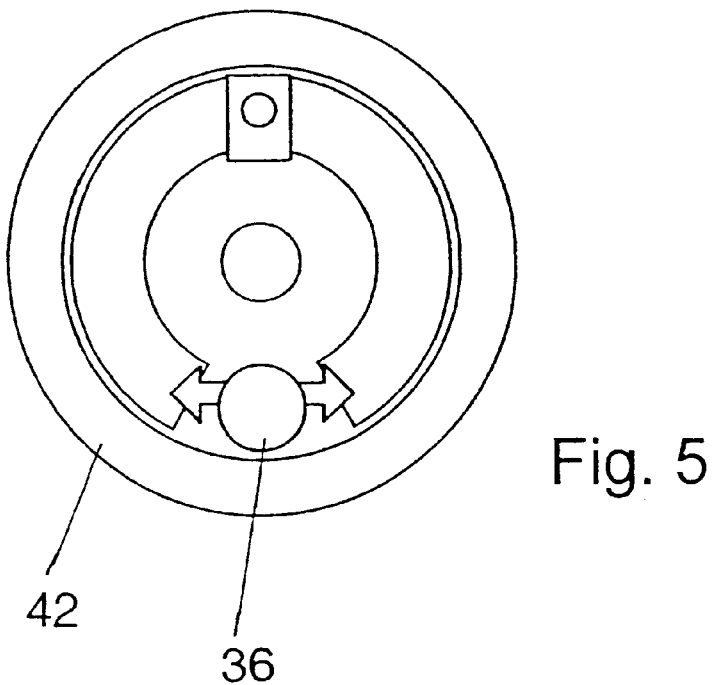
FIG. 5 is a diagrammatic representation of a section along line V—V in FIG. 4.

The second actuator 36 is also arranged, together with the parking lock 42, in the housing 48 of the automatic gearbox 28 (FIGS. 4 and 5). The second actuator 36 is mounted on the parking lock 42, constructed as a shoe brake, and forms with said lock an assembly which can be separately manufactured, checked for its operation and installed as a module. If the first actuator 34 fails, the automatic gearbox 28 can be adjusted by the second actuator 36 via an hydraulic line 78 so that the motor vehicle can at least be driven to the nearest garage for repair.

In a further embodiment, not shown in greater detail, an automatic gearbox can be adjusted by a second actuator via a mechanical connection so that the motor vehicle can at least be driven to the nearest workshop for repair.

Figure 6:
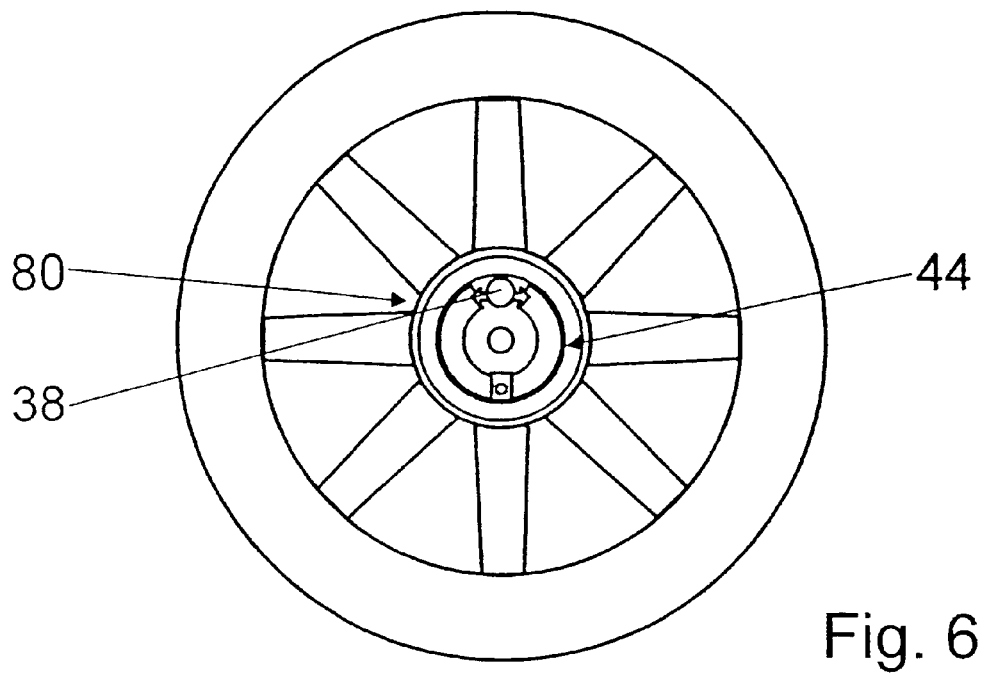
FIG. 6 shows an actuator, built into a wheel hub, for operating a parking lock.
Figure 7:
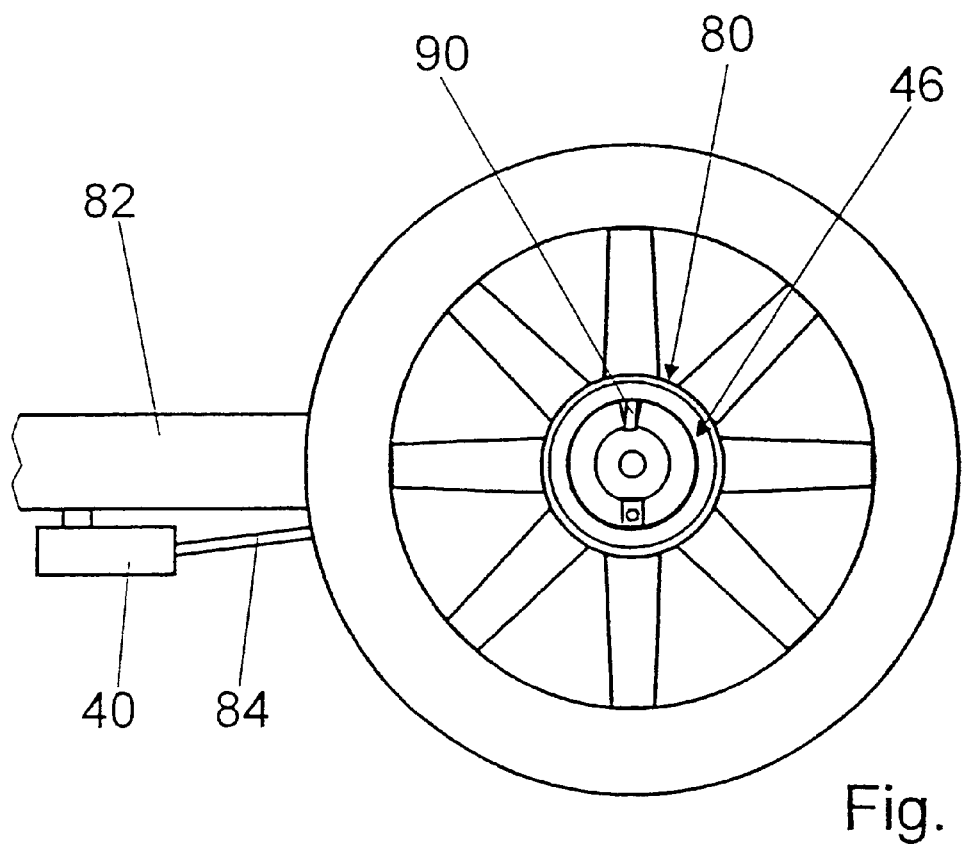
FIG. 7 shows an actuator, mounted on a chassis, for operating a parking lock in a wheel hub.

FIGS. 6 and 7 show alternative actuators 38, 40 for operating parking locks 44, 46 which are arranged outside the gearbox housing 48. Components which essentially remain the same are in principle numbered with the same reference symbols in the illustrative embodiments. The second actuator 38 is mounted together with the parking lock 44 constructed as a shoe brake in a wheel hub 80 of the motor vehicle. The second actuator 40 is mounted on a chassis part 82 of the motor vehicle and acts via a linkage 84 on a adjusting lever 90 of the parking lock 46 constructed as a shoe brake in the wheel hub 80 of the motor vehicle. Both parking locks 44, 46 are constructed of one piece with parking brakes. The parking locks 44, 46 are only self-locking below a traveling speed of 3 km/h due to a centrifugal clutch, not shown in greater detail, and can also be used for decelerating the motor vehicle by means of the second actuator 38, 40 above a traveling speed of 3 km/h.

The input unit 18 has a first input device 54 and a second input device 56 which is independent of the first input device 54, in which arrangement input data R, N, D, P provided for the first input device 54 can be input via the second input device 56 in the case of a fault in the first input device 54 (FIG. 1). In normal operation, the second input device 56 is used for controlling a radio cassette system and is integrated in a steering wheel of the motor vehicle, not shown in greater detail. In the emergency driving program, that is to say with a failed first input unit 54, the driver of the motor vehicle is guided in inputting the input data R, N, D, P into the second input device 56 via a menu, visually via a display of the radio cassette system and, if desired, aurally via the loudspeaker 58 of the radio cassette system.

Apart from an input via operating elements of the first and the second input devices 54, 56, the input data R, N, D, P can also be input aurally into the input unit 18 via a microphone 86 of a hands-free system of a mobile telephone system. The aural data are converted into a format which can be used by the input unit 18 and, respectively, by the controllers 10, 12, via a speech recognition module 88. The state of readiness to receive in the input unit 18 can be activated via a key on the steering wheel and via an aural codeword which can be selected by the driver.

Information relating to the automatic gearbox 28 is output by a display, such as, for example, the driving position selected. Furthermore, individual information items are aurally output by the loudspeakers 58, the driver being notified to set the driving position P when parking the motor vehicle. The driver can advantageously also deactivate the voice output.

The controllers 10, 12 are connected to a driver assistance system, not shown in greater detail, via the controller 72 and via the data network 32. If the driver assistance system is activated, the second actuator 36, 38, 40 automatically operates the parking lock 42, 44, 46 when the motor vehicle is being parked and releases it when a desire to drive off is detected.

Figure 10:
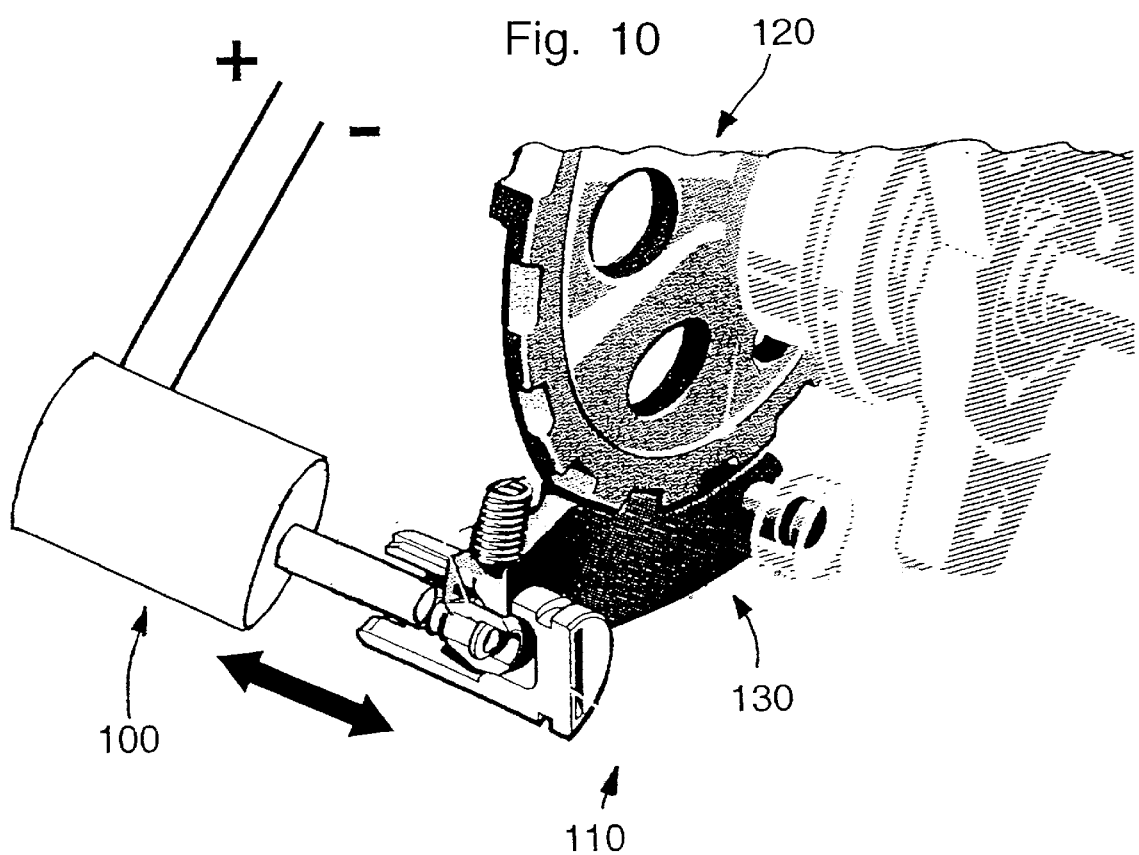
FIG. 10 is a further illustrative embodiment of an actuator for operating a parking lock catch.

FIG. 10 shows a second actuator 100 for operating a parking lock 110 in a further illustrative embodiment. In this parking lock 110, a parking lock gear 120 can be fixed by means of a parking lock catch 130.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Gearshift device for a motor vehicle comprising:

an input unit for receiving input data, said input unit being connected via at least one data line to a first controller for controlling an actuator unit for setting a gearbox of a motor vehicle; and at least one second controller which is independent of the first controller; wherein apart from the first controller, the second controller is connected to the input unit via at least one data line; and upon occurrence of a fault in the first controller, the actuator unit can be controlled at least partially by means of the second controller correspondingly to the first controller.

2. The gearshift device according to claim 1, wherein the second controller:

receives at least partly the same input data as the first controller;

performs at least in part the same evaluation, and monitors the first controller.

3. The gearshift device according to claim 2, wherein upon occurrence of a fault, with an unacceptable deviation between an evaluated output variable of the first controller and an evaluated output variable of the second controller, the second controller deactivates the first controller, and at least partially takes over the operation of the first controller.

4. The gearshift device according to claim 1, wherein each controller is connected to the actuator unit via a respective tristate line.

5. The gearshift device according to claim 4, wherein:

the respective tristate lines of the controllers are connected to one another; and upon occurrence of a fault, the second controller short-circuits at least one tristate line, deactivating the first controller via a current limiter.

6. The gearshift device according to claim 1, wherein upon occurrence of a fault, in a deactivated state of the controllers, the actuator unit assumes or maintains a position in which a flow of force between the gearbox and an internal combustion engine of the vehicle is interrupted.

7. The gearshift device according to claim 1, wherein the controllers are connected to a data network of the motor vehicle.

8. The gearshift device according to claim 1, wherein at least one of the two controllers can be used for at least one further control function apart from control functions of the gearbox.

9. The gearshift device according to claim 1, wherein:

the actuator unit includes at least one first actuator, and at least one second actuator which is independent of the first actuator;

the first actuator is used, in normal operation, for setting a driving position and a neutral position at the gearbox; and the second actuator is used for operating a parking lock in a park position of the gearbox.

10. The gearshift device according to claim 9, wherein the first actuator is arranged in a gearbox housing.

11. The gearshift device according to claim 10, wherein the first actuator acts directly on an hydraulic slide valve.

12. The gearshift device according to claim 9, wherein the second actuator is arranged in a gearbox housing.

13. The gearshift device according to claim 9, wherein the second actuator is arranged outside a gearbox housing; and a parking brake can be operated by means of the second actuator.

14. The gearshift device according to claim 13, wherein the parking lock and the parking brake are constructed of a single piece.

15. The gearshift device according to claim 9, wherein the parking lock is self-locking only below a certain traveling speed.

16. The gearshift device according to claim 9, wherein a braking unit for decelerating the motor vehicle from relatively great speeds can be operated via the second actuator.

17. The gearshift device according to claim 9, wherein, upon occurrence of a fault in the first actuator, the gearbox can be adjusted via the second actuator.

18. The gearshift device according to claim 1, wherein:

the input unit has at least one first input device and a second input device which is independent of the first input device; and upon occurrence of a fault at the first input device, input data intended at least partially for the first input device can be input via the second input device.

19. The gearshift device according to claim 18, wherein in normal operation, the second input device has a function which differs from that of the first input device.

20. The gearshift device according to claim 18, wherein the second input device is integrated in a steering wheel of the motor vehicle.

21. The gearshift device according to claim 1, wherein input data can be entered orally into the input unit.

22. The gearshift device according to claim 21, wherein a state of readiness to receive can be activated in the input unit by one of a key and a special oral command.

23. The gearshift device according to claim 1, wherein information relating to the gearbox can be output via loudspeakers.

24. The gearshift device according to claim 23, wherein the loudspeakers are part of another system existing on the vehicle.

25. The gearshift device according to claim 1, wherein at least one controller is connected to a driver assistance system.

26. The gearshift device according to claim 25, wherein, when the motor vehicle is being parked, the actuator unit automatically closes a parking lock.

27. The gearshift device according to claim 26, wherein, when a desire to drive off has been detected, the actuator unit automatically releases the parking lock.

28. The gearshift device according to claim 25, wherein, when a standstill of the motor vehicle is desired, the actuator unit interrupts a flow of force between the gearbox and an internal combustion engine.

29. The gearshift device according to claim 25, wherein, in the case of an impending impact of the motor vehicle against an object, at least one of the controller and the driver assistance system intervenes in the vehicle control and counteracts the impact.

30. The gearshift device according to claim 25, wherein in the case of a movement of the motor vehicle in an unwanted direction, the actuator unit prevents the movement via a parking lock.

* * * * *